United States Patent
Hsieh et al.

(10) Patent No.: US 7,243,183 B2
(45) Date of Patent: Jul. 10, 2007

(54) SONET DATA BYTE SWITCH

(75) Inventors: Jack Hsieh, Petaluma, CA (US); Hung Dang, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 422 days.

(21) Appl. No.: 11/031,861

(22) Filed: Jan. 7, 2005

(65) Prior Publication Data

US 2006/0155910 A1    Jul. 13, 2006

(51) Int. Cl.
*H04Q 11/04*    (2006.01)
(52) U.S. Cl. .................... 711/5; 370/370; 370/371; 370/372; 370/373; 370/374; 370/375; 370/376; 370/379; 370/382
(58) Field of Classification Search ............. 711/5; 370/370, 371, 372, 373, 374, 375, 376, 379, 370/382
See application file for complete search history.

(56) References Cited

U.S. PATENT DOCUMENTS

| | | | |
|---|---|---|---|
| 5,521,912 A * | 5/1996 | Kattke et al. ............... 370/376 |
| 5,860,080 A * | 1/1999 | James et al. ................. 711/4 |
| 5,978,354 A | 11/1999 | Taketomi | |
| 6,097,735 A | 8/2000 | Nemoto | |
| 6,393,515 B1 * | 5/2002 | Pollack et al. ............. 711/108 |
| 6,801,464 B2 | 10/2004 | Kawano | |

* cited by examiner

*Primary Examiner*—Hyung Sough
*Assistant Examiner*—Shawn Eland
(74) *Attorney, Agent, or Firm*—Cindy Kaplan

(57) ABSTRACT

A switch system including a plurality of input ports and a plurality of output ports for transferring data from one of the input ports to one of the output ports, and a plurality of memory devices is disclosed. The memory devices include a first memory bank configured for data being written to the first memory bank while data is read from the first memory bank at a timeslot and a second memory bank, which is smaller than the first memory bank and configured for writing the data read from the first memory bank to the second memory bank and reading data from the second memory bank. The system further includes an address comparer configured to compare a write address of the first memory bank with a read address of the first memory bank and select data for output from the first memory bank if the write address is smaller than the read address and select data from the second memory bank if the read address is equal to or smaller than the write address.

28 Claims, 3 Drawing Sheets

SONET DATA BYTE SWITCH

BACKGROUND OF THE INVENTION

The present invention relates generally to communication networks, and more specifically, to a SONET data byte switch.

Network switches are used to switch network traffic at high speeds between ports and enable information (formatted in packets) to be switched from one port to another based upon addresses embedded in the packets. Packet switching decisions are performed by processors incorporated within each switching node. A local static random access memory (SRAM) for temporarily storing ingress and egress packets is incorporated within each of the switch nodes.

An example of a conventional SONET/SDH STS-1/STM-1 SRAM based digital cross connect is shown in FIG. 1. The system includes a plurality of input ports and output ports and is configured such that data entering each input port can randomly cross switch to any of the output ports. The system utilizes two SRAM memory banks that are each 128 bytes wide and 48 words deep for each output port. The memory banks use a "ping-pong" design. In the example shown in FIG. 1, there are 256 instances of these memory banks across the 128 ports. Each SRAM is designed to accommodate one byte wide timeslot from each of the 48 STS-1s in every input STS-48 signal. While one memory bank (bank 1) is being written input frame data in order from all ports, the other memory bank (bank 2) is being read out randomly from previous stored frame data. For example, for STS-48, every 48 clocks bank 1 is sequentially written with one byte from each STS-1 in each STS-48, while 48 words are read in random order from bank 2. In the next cycle of 48 clocks, bank 1 is randomly read and bank 2 is sequentially written. This process continues alternating between read and write of the two banks at 48 clock intervals.

As can be observed from the foregoing, this conventional design structure requires a large amount of SRAM when supporting 128 or even more ports in an ASIC (application-specific integrated circuit) design. Conventional SRAM based cross connect designs, such as the one described above, are becoming increasingly dense, thus increasing costs and preventing ASIC expansion for future designs.

There is, therefore, a need for a data byte switch that reduces the amount of SRAM required without losing currently available functionality.

SUMMARY OF THE INVENTION

A switch system including a plurality of input ports and a plurality of output ports for transferring data from one of the input ports to one of the output ports, and a plurality of memory devices is disclosed. The memory devices generally comprise a first memory bank configured for data being written to the first memory bank while data is read from the first memory bank at a timeslot and a second memory bank, which is smaller than the first memory bank and configured for writing the data read from the first memory bank to the second memory bank and reading data from the second memory bank. The system further includes an address comparer configured to compare a write address of the first memory bank with a read address of the first memory bank and select data for output from the first memory bank if the write address is smaller than the read address and select data from the second memory bank if the read address is equal to or smaller than the write address.

A method for transferring data from one or more plurality of input ports to one or more plurality of output ports in a switch generally comprises receiving data at one or more of the input ports, writing the data to a first memory bank at a timeslot, reading data from the first memory bank at the timeslot, writing the data read from the first memory bank to a second memory bank, and reading data from the second memory bank. The method further includes comparing a write address of the first memory bank with a read address of the first memory bank and selecting data for output from the first memory bank if the write address is smaller than the read address and selecting data from the second memory bank if the read address is equal or smaller than the write address.

The memory banks may be SRAM based with the system implemented in an ASIC design. In one embodiment, the switch is configured for use in a SONET STS-1 network and the first memory bank is 128 bytes wide and 48 words deep and the second memory bank is 1 byte wide and 48 bytes deep.

Further understanding of the nature and advantages of the inventions herein may be realized by reference to the remaining portions of the specification and the attached drawings.

BRIEF DESCRIPTION OF THE DRAWINGS

Corresponding reference characters indicate corresponding parts throughout the several views of the drawings.

DESCRIPTION OF SPECIFIC EMBODIMENTS

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention operates in the context of a data communication network including multiple network elements. Some of the elements in a network that employs the present invention may be network devices such as routers and switches. For example, some of the nodes may be specially configured routers or switches such as those available from Cisco Systems, Inc. of San Jose, Calif. The router or switch may include, for example, a master central processing unit (CPU), interfaces, a hardware assisted forwarding engine, and a bus (e.g., a PCI bus). A network device having interfaces with physical media via a plurality of linecards may be used to implement the system. Linecards may incorporate SONET interfaces, for example. As packets are received, processed, and forwarded by the network device, they may be stored in packet memory. Memory can be RAM and there are many different ways in which memory may be coupled to the system. The system described herein may be implemented, for example, in a TDM cross connect switch ASIC/FPGA, or more specifically, a product such as Cisco ONS 15454 SONET Multi-service Provisioning Platform (MSPP).

A system of the present invention reduces the amount of SRAM required for a SONET data byte switch, while providing the same functions as conventional designs. As described in detail below, reading of data occurs simultaneously with writing of data to the same SRAM bank, so that the quantity of memory required is reduced from that of conventional designs. The system replaces the dual bank ping-pong SRAM structure used in conventional ASIC devices (described above) with one large bank of SRAM followed by one small pipeline SRAM. The system significantly reduces the amount of SRAM required to implement a SRAM based SONET/SDH digital cross connect, therefore reducing size and power consumption, and facilitating scaling to higher bandwidth and density. The design described herein may also be applied in other types of SRAM based switches.

Figure 1:
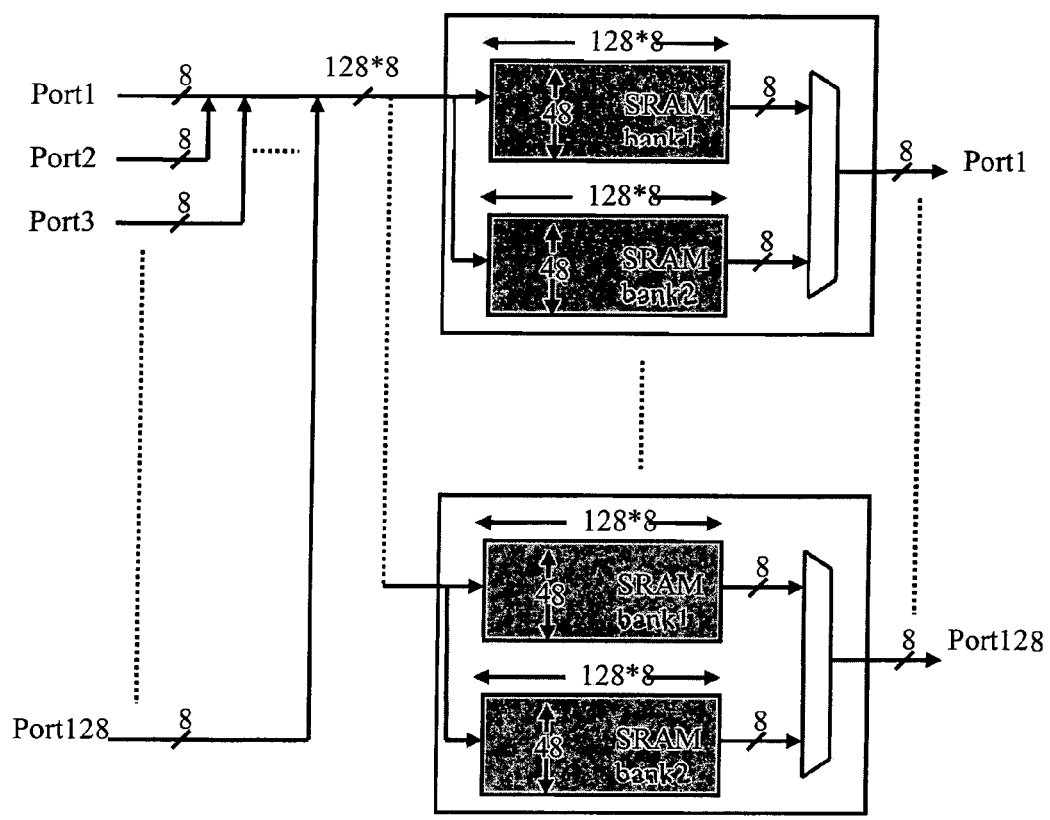
FIG. 1 is a schematic illustrating a prior art SONET STS-1 SRAM based digital cross connect switch.
Figure 2:
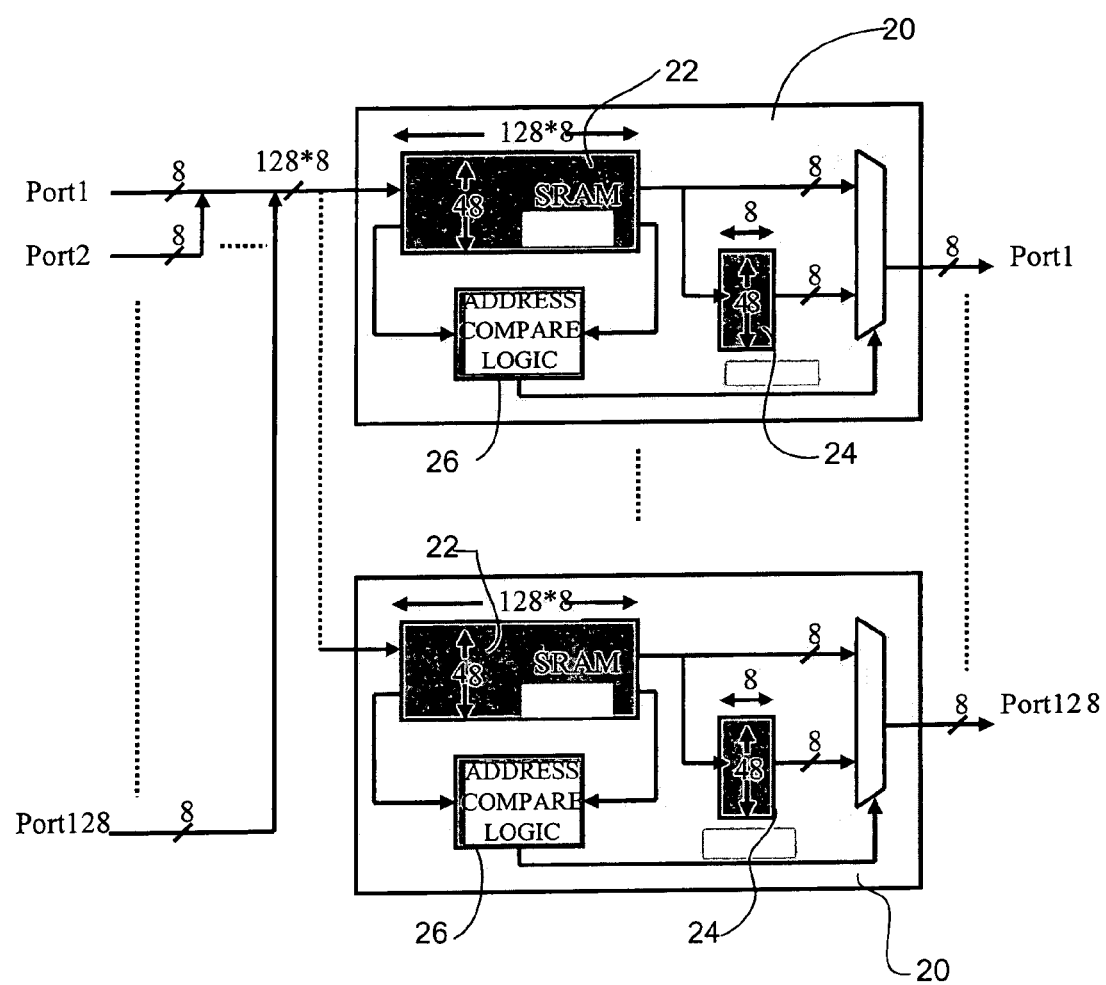
FIG. 2 is a schematic illustrating one embodiment of a SRAM based cross connect switch of the present invention.

Referring now to the drawings, and first to FIG. 2, one embodiment of a SRAM based cross connect switch system of the present invention is shown. The embodiment shown in FIG. 1 is for a SONET STS-1 (synchronous transport signal-1) data byte switch. It is to be understood that the switch may be configured to operate in any SONET/SDH network at any signal rate (e.g., STS-1, STS-3, STS-12, STS-48, STS-192, STS-768 etc.). As shown in FIG. 2, the system includes a plurality of input ports (ports 1-128) and output ports (ports 1-128). Only a portion of the ports are shown in FIG. 2 for simplification. The data received at the input ports can randomly cross switch to any of the output ports. The system further includes a plurality of memory devices 20 (only 2 of the 128 devices are shown). Each of the memory devices 20 of the cross connect include a large two port (one read port, one write port) SRAM (first bank) 22, one small SRAM (second bank) 24, and address compare logic (address comparer) 26. In the embodiment shown in FIG. 2, first bank 22 is 128 bytes wide and 48 words deep and second bank 24 is 1 byte wide and 48 bytes deep. First bank 22 is written to sequentially with one byte of data from each of the 48 STS-1 timeslots from each of the 128 input channels. At the same time, first bank 22 is randomly read with the read address for each timeslot determined by the contents of a connection SRAM. During each read cycle, only one of the 128 bytes of read data is selected for output. Because the data is read in random order, some reads may contain data from the previous frame while others may access data from the current frame. For every read cycle, the desired read data is always that of the previous frame. Second bank 24 is used to assure that the previous frame data is accessed for each read.

Second bank 24 operates as a pipeline storage for first bank 22 read data. During each timeslot, one byte of data is accessed in arbitrary order from first bank 22 and written to second bank 24 at sequential addresses. At each time timeslot, data is also read sequentially from second bank 24. The address compare logic 26 is used to select between the data byte read from first bank 22 and the data byte read from second bank 24. The address comparison logic 26 compares the first bank 22 write address with the first bank 22 read address. In the case where the address comparison indicates that current frame data is being accessed from first bank 22, second bank 24 read data is selected. For example, if the write address is smaller than the read address, data from the previous frame is being read from first bank 22 and the data from first bank 22 will be selected for output. If the read address is equal or smaller than the write address, the read data from first bank 22 is from the current frame and second bank 24 read data will be selected. In the case where there is a collision (i.e., write and read addresses are equal) in the address comparison logic 26, the first bank 22 write data will be written to first bank 22 and second bank 24 read data will be selected for output.

It is to be understood that the embodiment shown in FIG. 2 and described herein is only one example and the design described herein may be implemented for other types of RAM based data switches. For example, the switch may include any number of ports and be configured to operate with different data rates.

Figure 3:
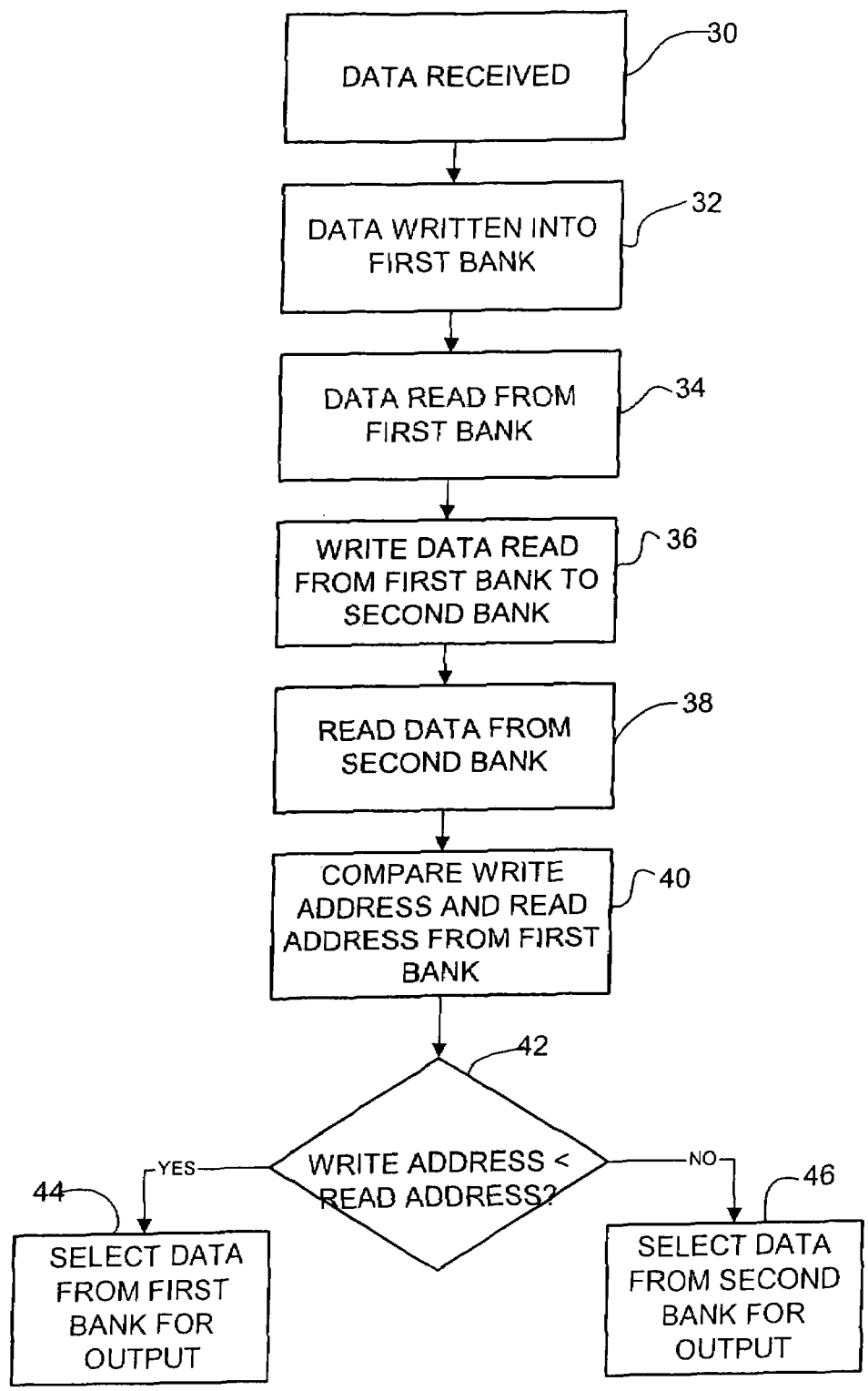
FIG. 3 is a flowchart illustrating a process for implementing the SRAM based digital cross connect switch.

FIG. 3 is a flowchart illustrating one example of a process for implementing the SRAM based cross connect switch of the present invention. Input data is first received at step 30. The data is written sequentially into first bank 22 with one byte from each of the 48 STS-1 timeslots from each of the 128 input channels (step 32). At the same time, data is randomly read from first bank 22 (step 34). During each timeslot, one byte is accessed in arbitrary order from first bank 22 and written to second bank 24 at sequential addresses (step 36). At each timeslot, data is also read sequentially from second bank 24 (step 38). One of the 128 bytes of read data is randomly selected for output each read cycle. The address compare logic 26 is used to determine whether the data from first bank 22 or second bank 24 is selected (step 40). If the write address is smaller than the read address, data from the previous frame is being read from first bank 22 and this data is selected for output (steps 42 and 44). If the write address is equal or larger than the read address, the read data from first bank 22 is from the current frame and the second bank 24 read data is selected (steps 42 and 46). For example, if the write address is 16 and the read address is 5, the data from first bank 22 for slot 5 is from the current frame. Thus, data from slot 5 is read from the second bank 24. If data was instead being read from slot 16 and written to slot 5, then the output data would be selected from the first memory bank 22. If there is a collision between the read and write addresses in the comparison logic, the first bank 22 write data is written to first bank 22 and second bank 24 read data is selected for output.

As can be observed from the foregoing, the system and method described herein have many advantages. The system reduces SRAM size, power consumption, and saves relate logic gates. The smaller SRAM provides room for future expansion so that new functions can be incorporated into the data byte switch.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A switch system, comprising a plurality of input ports and a plurality of output ports, wherein data is transferred from one of said input ports to one of said output ports, and a plurality of memory devices comprising:

a first memory bank configured for data being written to the first memory bank while data is read from the first memory bank at a timeslot;

a second memory bank, said second memory bank being smaller than said first memory bank and configured for writing said data read from the first memory bank to the second memory bank and reading data from the second memory bank; and an address comparer configured to compare a write address of the first memory bank with a read address of the first memory bank and select data for output from the first memory bank if said write address is smaller than said read address and select data from the second memory bank if said read address is equal to or smaller than said write address.

2. The system of claim 1 wherein the switch is configured for use in a TDM/SONET/SDH network.

3. The system of claim 1 comprising 128 input ports, 128 output ports, and 128 memory devices.

4. The system of claim 1 wherein the first and second memory banks are SRAM.

5. The system of claim 1 wherein the switch is implemented in an ASIC/FPGA design.

6. The system of claim 1 wherein said data read from the second memory bank has the same address as the data being read from the first memory bank at a timeslot.

7. The system of claim 1 wherein data is written to the second memory bank and read from the second memory bank at said timeslot.

8. The system of claim 1 wherein the first memory bank is 128 bytes wide and 48 words deep.

9. The system of claim 8 wherein the second memory bank is 1 byte wide and 48 bytes deep.

10. The system of claim 1 wherein the first memory bank is configured for data being written thereto sequentially.

11. The system of claim 10 wherein the first memory bank is configured for data being read therefrom randomly.

12. A method for transferring data from one or more plurality of input ports to one or more plurality of output ports in a switch, the method comprising:
receiving data at said one or more plurality of input ports;
writing said data to a first memory bank at a timeslot;
reading data from the first memory bank at said timeslot;
writing said data read from the first memory bank to a second memory bank;
reading data from the second memory bank; and
comparing a write address of the first memory bank with a read address of the first memory bank and selecting data for output from the first memory bank if said write address is smaller than said read address and selecting data from the second memory bank if said read address is equal to or smaller than said write address.

13. The method of claim 12 wherein the second memory device is smaller than the first memory device.

14. The method of claim 13 wherein the first memory bank is 128 bytes wide and 48 words deep and the second memory bank is 1 byte wide and 48 bytes deep.

15. The method of claim 12 wherein the first and second memory banks are SRAM.

16. The method of claim 12 wherein reading data from the second memory bank comprises reading data having the same address as said data being read from the first memory bank.

17. The method of claim 12 wherein writing data to the first memory bank comprises writing data sequentially to the first memory bank.

18. The method of claim 12 wherein reading data from the first memory bank comprises reading data randomly from the first data bank.

19. A switch system, comprising:
means for receiving data at one or more plurality of input ports;
means for writing said data to a first memory bank at a timeslot;
means for reading data from the first memory bank at said timeslot;
means for writing said data read from the first memory bank to a second memory bank;
means for reading data from the second memory bank; and
means for comparing a write address of the first memory bank with a read address of the first memory bank and selecting data for output from the first memory bank if said write address is smaller than said read address and selecting data from the second memory bank if said read address is equal to or smaller than said write address.

20. The system of claim 19 wherein the switch is configured for use in a SONET network.

21. The system of claim 19 wherein the first and second memory banks are SRAM.

22. The system of claim 19 wherein the switch is implemented in an ASIC/FPGA design.

23. The system of claim 19 wherein the first memory bank is 128 bytes wide and 48 words deep and the second memory bank is 1 byte wide and 48 bytes deep.

24. The system of claim 19 wherein the first memory bank is configured for data being written thereto sequentially.

25. The system of claim 19 wherein the first memory bank is configured for data being read therefrom randomly.

26. The system of claim 19 wherein the first memory bank is larger than the second memory bank.

27. The system of claim 19 wherein the second memory bank operates as pipeline storage for the first memory bank.

28. The system of claim 19 wherein the switch system is a TDM cross connect switch.

* * * * *